US011402084B1

(12) United States Patent
Li

(10) Patent No.: US 11,402,084 B1
(45) Date of Patent: Aug. 2, 2022

(54) QUICK CONNECTION DEVICE FOR CEILING FAN AND LAMP WITH WATERPROOF FUNCTION

(71) Applicant: Guanghai Li, Jiangmen (CN)

(72) Inventor: Guanghai Li, Jiangmen (CN)

(73) Assignee: Guanghai Li, Jiangmen (CN)

( * ) Notice: Subject to any disclaimer, the term of this patent is extended or adjusted under 35 U.S.C. 154(b) by 67 days.

(21) Appl. No.: 17/153,545

(22) Filed: Jan. 20, 2021

(51) Int. Cl.
| | |
|---|---|
| *F21V 21/03* | (2006.01) |
| *F04D 29/64* | (2006.01) |
| *F21V 33/00* | (2006.01) |
| *F21S 8/04* | (2006.01) |
| *F16M 13/02* | (2006.01) |

(52) U.S. Cl.
CPC ............ *F21V 21/03* (2013.01); *F04D 29/646* (2013.01); *F16M 13/027* (2013.01); *F21S 8/04* (2013.01); *F21V 33/0096* (2013.01)

(58) Field of Classification Search
CPC .... F21V 21/03; F21V 33/0096; F04D 29/646; F16M 13/027; F21S 8/04
USPC .................................. 362/149, 158; 248/343
See application file for complete search history.

(56) References Cited

U.S. PATENT DOCUMENTS

| | | | | | |
|---|---|---|---|---|---|
| 4,513,940 | A | * | 4/1985 | Alperin | F04D 29/646 248/343 |
| 2010/0329885 | A1 | * | 12/2010 | Criner | F04D 29/601 248/343 |
| 2020/0224677 | A1 | * | 7/2020 | Jones | F04D 29/601 |

FOREIGN PATENT DOCUMENTS

| | | | |
|---|---|---|---|
| CN | 113375984 A | * | 12/2021 |
| WO | WO2015027663 A1 | * | 3/2015 |

* cited by examiner

*Primary Examiner* — Laura K Tso
(74) *Attorney, Agent, or Firm* — Vivacqua Crane, PLLC

(57) ABSTRACT

Disclosed is a quick connection device, which includes an upper cover and a lamp, the upper cover comprises an upper cover body and an upper cover covering edge integrally formed with the upper cover body, the upper cover covering edge is positioned at an outer side of the upper cover body, and a clamping groove is provided at an inner wall of the upper cover body; the lamp comprises a lower cover connected to the upper cover, the lower cover comprises a lower cover body and a lower cover covering edge integrally formed with the lower cover body, the lower cover covering edge is positioned at an outer side of the lower cover body, a clamping block is arranged on an outer wall of the lower cover body, and the lower cover body is clamped in the clamping groove of the upper cover body through the clamping block.

10 Claims, 7 Drawing Sheets

QUICK CONNECTION DEVICE FOR CEILING FAN AND LAMP WITH WATERPROOF FUNCTION

STATEMENT REGARDING PRIOR DISCLOSURES BY INVENTOR

Applicant respectfully submits that Chinese Patent Application Number CN201921145926.4, published on Apr. 21, 2020, qualifies as a grace period inventor disclosure under 35 U.S.C. § 102(b)(1)(A).

TECHNICAL FIELD

The present disclosure relates to the field of ceiling fans, and, in particular, to a quick connection device for a ceiling fan and a lamp with a waterproof function.

BACKGROUND

Currently, ceiling fans with lamps are common decorative ceiling fans. For manufacturers, how to quickly assemble ceiling fans is the key to improving production efficiency. In the existing technologies, a switch box is usually used to connect a motor. Although a stable connection can be implemented, there is a gap in the direct joint between the switch box and a lamp panel. For waterproof performance considerations, it is further necessary to additionally mount waterproof components on the periphery of the switch box. Therefore, the lamps and the waterproof components need to be assembled one by one. Consequently, the structure is complicated, many procedures are required during assembly, and thus the production efficiency is low.

SUMMARY

The objective of the present disclosure is to address at least one of technical problems existing in the existing technology, and to provide a quick connection device for a ceiling fan and a lamp with a waterproof function, which can implement quick connection on the basis of improving the waterproof performance of a lamp with a ceiling fan.

In a first aspect of the present disclosure, a quick connection device for a ceiling fan and a lamp with a waterproof function is provided, which includes an upper cover and the lamp, wherein the upper cover comprises an upper cover body and an upper cover covering edge integrally formed with the upper cover body, the upper cover covering edge is positioned at an outer side of the upper cover body, and a clamping groove is provided at an inner wall of the upper cover body; wherein the lamp comprises a lower cover connected to the upper cover, the lower cover comprises a lower cover body and a lower cover covering edge integrally formed with the lower cover body, the lower cover covering edge is positioned at an outer side of the lower cover body, a clamping block is arranged on an outer wall of the lower cover body, and the lower cover body is clamped in the clamping groove of the upper cover body through the clamping block, in response to the upper cover being connected to the lower cover, the upper cover covering edge is positioned at an outer side of the lower cover covering edge, and a plane where a lower edge of the upper cover covering edge is located is lower than a plane where an upper edge of the lower cover covering edge is located.

According to some embodiments of the present disclosure, a plurality of anti-sliding portions are provided at an outer side surface of the upper cover covering edge.

According to some embodiments of the present disclosure, each of the plurality of anti-sliding portions is a protrusion protruding from the surface of the upper cover covering edge, and a plurality of second connecting holes for arranging a connecting piece are further formed in the plurality of anti-sliding portions.

According to some embodiments of the present disclosure, the clamping groove is a sliding groove with a single side opening, and a tooth-shaped protrusion for fastening the clamping block is provided at a contact surface between the clamping groove and the clamping block.

According to some embodiments of the present disclosure, the upper cover covering edge comprises at least two clamping grooves, a groove is formed between adjacent clamping grooves, and a blocking portion is respectively formed at two sides of the groove.

According to some embodiments of the present disclosure, a positioning groove for fitting and positioning with the blocking portion is provided at a position of a bottom side of the lower cover corresponding to the clamping block.

According to some embodiments of the present disclosure, a plurality of first connecting holes for connecting an external component are arranged in the lower cover.

According to some embodiments of the present disclosure, a mounting hole is arranged in the upper cover, a column bolt passing through the lower cover is arranged at a position of the lower cover corresponding to the mounting hole, an inner side of the column bolt is provided with an internal thread, and an outer side of the column bolt is provided with an external thread.

According to some embodiments of the present disclosure, a positioning block is provided at one side of the column bolt, and the positioning block and the column bolt are integrally formed.

According to some embodiments of the present disclosure, the lamp further comprises a heat dissipation pad, a lamp panel and a lampshade which are fixedly connected to the lower cover.

The quick connection device with a waterproof function of the present disclosure has at least the following beneficial effects: The quick connection device according to the technical solution of the present disclosure includes an upper cover and a lamp, where the upper cover includes an upper cover body and an upper cover covering edge, a clamping groove is provided at an inner wall of the upper cover body, and a lower cover is arranged in the lamp. The lower cover includes a lower cover body and a lower cover covering edge, a clamping block is provided at an outer side of the lower cover body, and the lower cover is clamped with the clamping groove of the upper cover through the clamping block. After clamping, the upper cover covering edge is located at an outer side of the lower cover covering edge, and a lower edge of the upper cover covering edge is lower than an upper edge of the lower cover covering edge to form a height difference, which can have a certain protection function against water splashed at the sides. Additionally, the lower cover is arranged in the lamp, and connection and water resistance can be implemented by only simple clamping, thereby effectively improving the production efficiency.

BRIEF DESCRIPTION OF THE DRAWINGS

The present disclosure is further described below with reference to accompanying drawings and embodiments.

DETAILED DESCRIPTION

Figure 1:
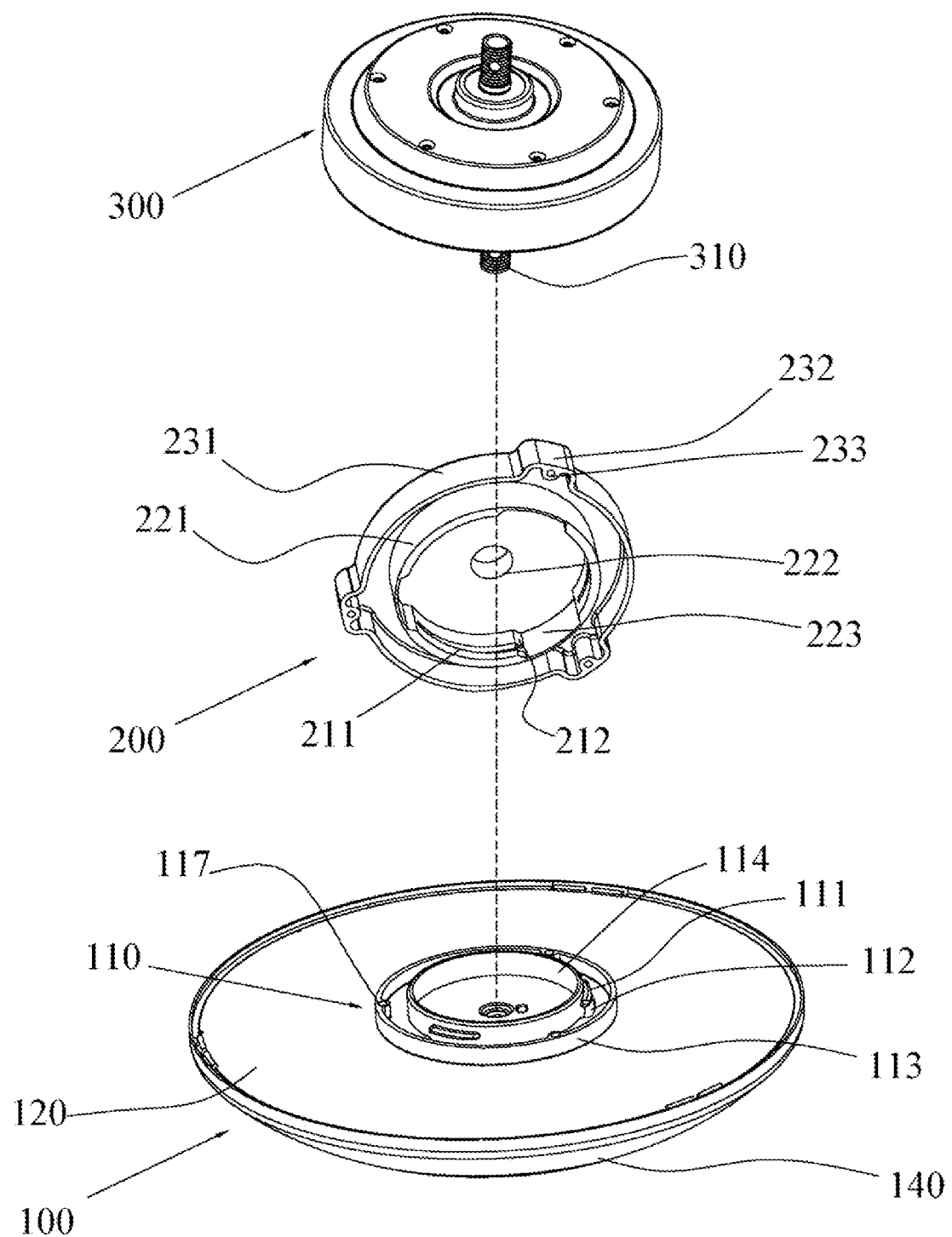
FIG. 1 is a schematic exploded view of an embodiment of the present disclosure.

This section will describe some embodiments of the present disclosure in detail, and the preferred embodiments of the present disclosure are shown in the accompanying drawing. The accompanying drawings function to supplement the description of the text part of the specification with graphics, so that people can visually and vividly understand each technical feature and the overall technical solution of the present disclosure, but the accompanying drawings cannot be understood as limiting the protection scope of the present disclosure.

In the description of the present disclosure, it should be understood that if orientation description is involved, the orientation or position relationship indicated by, for example, "up", "down", "front", "rear", "left" and "right" is based on the orientation or position relationship shown in the drawings, and these terms are just used to facilitate description of the present disclosure and simplify the description, but not to indicate or imply that the mentioned device or elements must have a specific orientation and must be established and operated in a specific orientation, and thus, these terms cannot be understood as a limitation to the present disclosure.

In the description of the present disclosure, "a plurality of" means one or more, and "a plurality of" means more than two. "Greater than", "less than", "exceeding", and the like are understood as excluding this number, and "above", "below", "within", and the like are understood as including this number. First and second in description are only for the purpose of distinguishing between technical features, and cannot be understood as indicating or implying relative importance or implicitly indicating the number of technical features indicated or implicitly indicating the sequence relationship of indicated technical features.

In the description of the present disclosure, unless otherwise explicitly defined, the words such as "setting", "mounting" and "connecting" should be understood in a broad sense, and those skilled in art can properly determine the specific meanings of the above words in the present disclosure with reference to the specific content of the technical solution.

Referring to FIG. 1 to FIG. 4, a quick connection device with a waterproof function includes an upper cover 200 and a lamp 100, where the upper cover 200 includes an upper cover body 221 and an upper cover covering edge 231 integrally formed with the upper cover body 221, the upper cover covering edge 231 is positioned at an outer side of the upper cover body 221, and an inner wall of the upper cover body 221 is provided with a clamping groove 211; the lamp 100 includes a lower cover 110 connected to the upper cover 200, the lower cover 110 includes a lower cover body 114 and a lower cover covering edge 113 integrally formed with the lower cover body 114, the lower cover covering edge 113 is positioned at an outer side of the lower cover body 114, a clamping block 111 is arranged on an outer wall of the lower cover body 114, and the lower cover body 114 is clamped in the clamping groove 211 of the upper cover body 221 through the clamping block 111; when the upper cover 200 is connected to the lower cover 110, the upper cover covering edge 231 is positioned at an outer side of the lower cover covering edge 113, and a plane where a lower edge of the upper cover covering edge 231 is located is lower than a plane where an upper edge of the lower cover covering 113 edge is located.

It should be noted that the upper cover 200 and the lower cover 110 can be in any shape, as long as they can be clamped together with the clamping block 111 and the clamping groove 211. In this embodiment, the upper cover 200 and the lower cover 110 each preferably have a cylindrical structure with a single side opening, or can be arranged in a square or another shape, as long as they can be clamped. The specific shape is adjustable according to actual needs. It can be understood that since the lower cover 110 needs to be embedded into the upper cover 200 for clamping, the single-sided opening can be more beneficial to implementing the above connection mode. It can be understood that the clamping block 111 is arranged at the outer side of the lower cover body 114, and the clamping groove 211 is arranged at the inner side of the upper cover body 221, so the diameter of the lower cover body 114 is less than that of the upper cover body 221, and the specific value is adjustable according to actual needs, as long as the clamping block 111 can be used for clamping. It can be understood that for the sake of waterproof effect, after the upper cover 200 and the lower cover 110 are clamped, the opening of the upper cover 200 is downward and the opening of the lower cover 110 is upward. Therefore, in this embodiment, the upper cover covering edge 231 is located at an outer side of the lower cover covering edge 113, and there is a height difference, so that the upper cover covering edge 231 can block splashed water. The lower cover covering edge 113 has a certain height, and can achieve a certain blocking effect on water flowing in from a gap. It can be understood that, based on the above requirements for the waterproof effect, in this embodiment, the diameter of the upper cover covering edge 231 is greater than that of the lower cover covering edge 113, and the diameter of the lower cover covering edge 113 is greater than that of the upper cover body 221, to implement better mounting and fitting. It should be noted that the clamping block 111 can be clamped with the clamping groove 211 in any form, and is preferably slidably clamped in this embodiment, which can implement mounting more conveniently. It can be understood that the clamping groove 211 and the clamping block 111 can have any shape and any angle. In this embodiment, preferably, the clamping groove 211 tapers from an inlet end to a tail end and forms a certain included angle with the horizontal plane. The clamping block 111 is fitted with the clamping groove 211 in angle, so that the clamping block 111 can slide into the clamping groove 211 under the condition that the upper cover 200 and the lower cover 110 are not completely attached to each other. During sliding, the clamping groove 211 has a certain angle and tapers, so that when the clamping block 111 slides to the tail end of the clamping groove 211, the upper cover 200 is close to the lower cover 110, thereby making the mounting more convenient.

Figure 2:
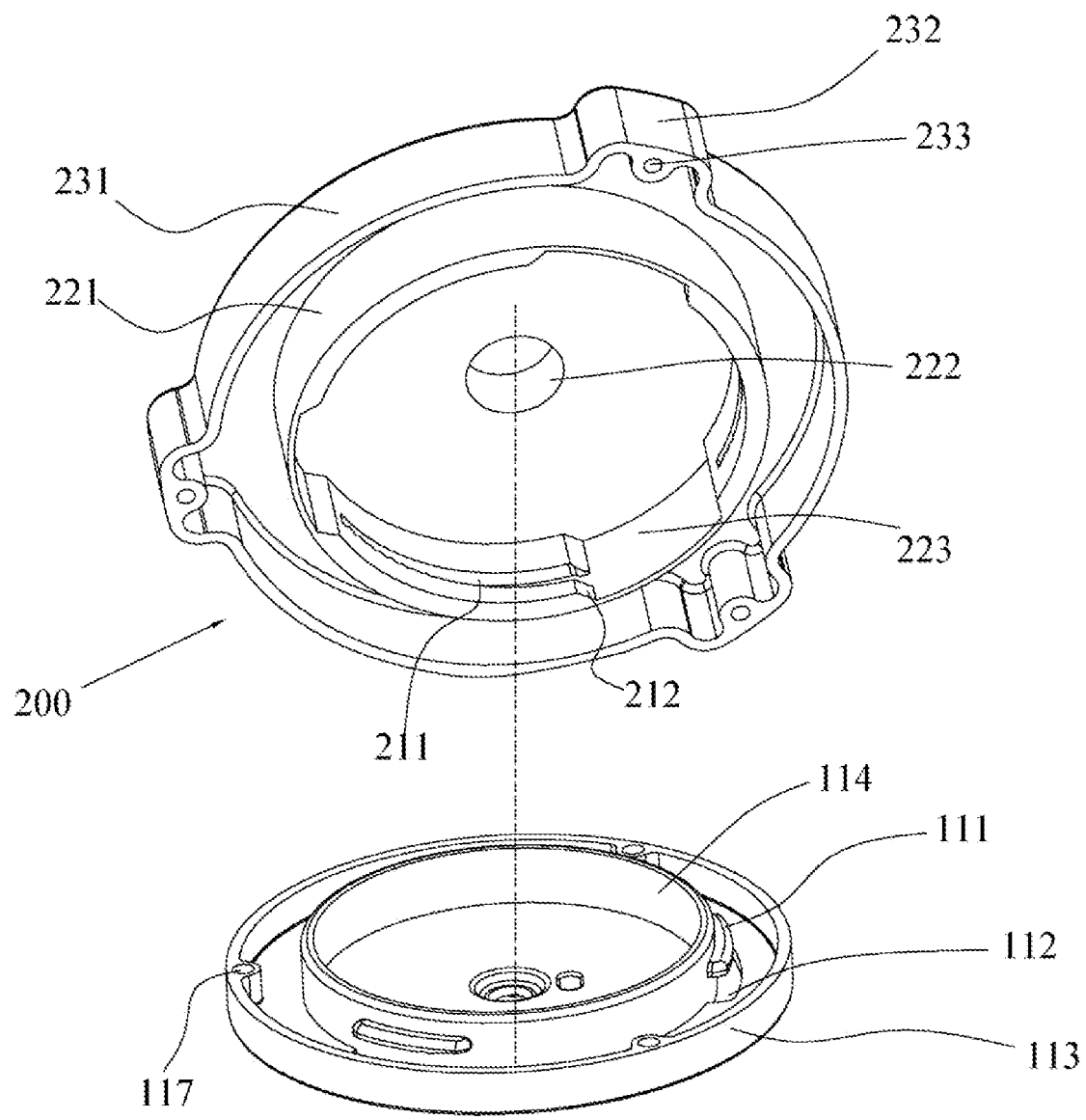
FIG. 2 is a schematic structural diagram of an upper cover and a lower cover according to an embodiment of the present disclosure.

Referring to FIG. 2, further, in another embodiment of the present disclosure, an outer side surface of the upper cover covering edge 231 is provided with a plurality of anti-sliding portions 232.

It should be noted that the number of the anti-sliding portions 232 may be arbitrary, as long as it can facilitate the rotation of the upper cover 200 to make the upper cover 200 clamped with the lower cover 110. It can be understood that, in this embodiment, preferably, a plurality of anti-sliding portions 232 can be equidistantly distributed, to better facilitate the mounting of the upper cover 200.

Referring to FIG. 2, in another embodiment of the present disclosure, the anti-sliding portion 232 is a protrusion protruding from the surface of the upper cover covering edge 231, and a plurality of second connecting holes 233 for arranging connecting pieces are further formed in the anti-sliding portion 232.

It should be noted that the anti-sliding portion 232 may be a protrusion, or anti-sliding stripe, or the like, which can be configured to assist in rotating the upper cover 200. In this embodiment, a protrusion is preferably used to make it easier to rotate the upper cover 200. It can be understood that the second connecting hole 233 provided in the anti-sliding portion 232 is used as a reserved hole, and can be configured to connect any component, for example, connecting to the lamp 100 through the connecting pieces. The specific connecting component and connecting mode can be adjusted according to actual needs.

Referring to FIG. 2, in another embodiment of the present disclosure, the clamping groove 211 is a sliding groove with a single side opening, and a contact surface between the clamping groove 211 and the clamping block 111 is provided with a tooth-shaped protrusion for fastening the clamping block 111.

It should be noted that it is only preferable in this embodiment that the clamping groove 211 is open at a single side, and the clamping groove 211 may be open at both sides and then positioned through a positioning component. In this embodiment, preferably, the clamping groove 211 is a sliding groove with a single side opening. Besides, the tooth-shaped protrusion is arranged in the clamping groove 211 to implement anti-sliding and fastening during sliding of the clamping block 111.

Referring to FIG. 2, in another embodiment of the present disclosure, the upper cover covering edge 231 includes at least two clamping grooves 211, a groove 223 is formed between adjacent clamping grooves 211, and blocking portions 212 are formed at two sides of the groove 223.

It should be noted that the number of the clamping grooves 211 can be arbitrary, as long as the upper cover 200 is stably clamped with the lower cover 110. In this embodiment, preferably, there are three clamping grooves 211 and three clamping blocks 111, and the specific number is adjustable according to actual production needs. It should be noted that a plurality of clamping grooves 211 may be embedded in different positions of the upper cover covering edge 231. In this embodiment, preferably, the groove 223 is formed between adjacent clamping grooves 211 for distinguishing, and the blocking portions 212 are formed for positioning.

Figure 3:
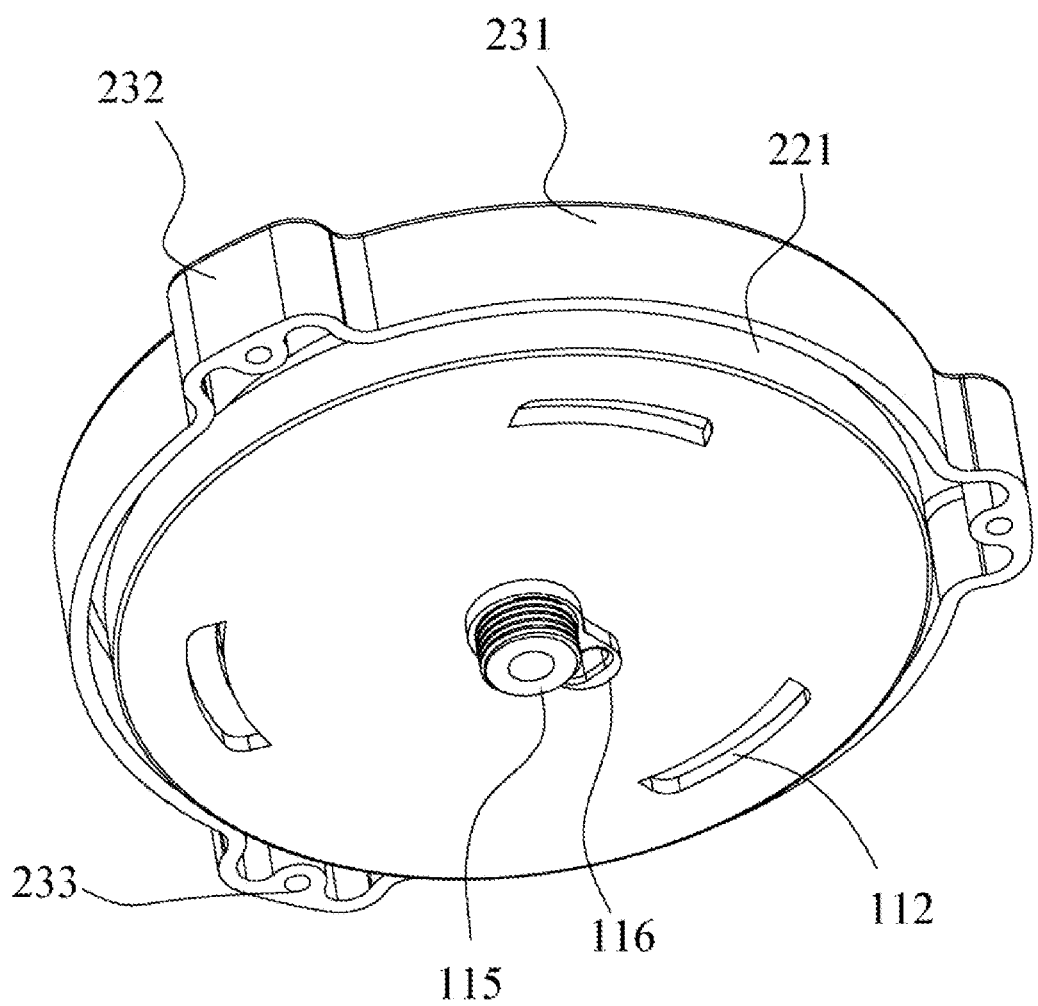
FIG. 3 is a schematic structural diagram of the upper cover and the lower cover after they are connected according to an embodiment of the present disclosure.
Figure 4:
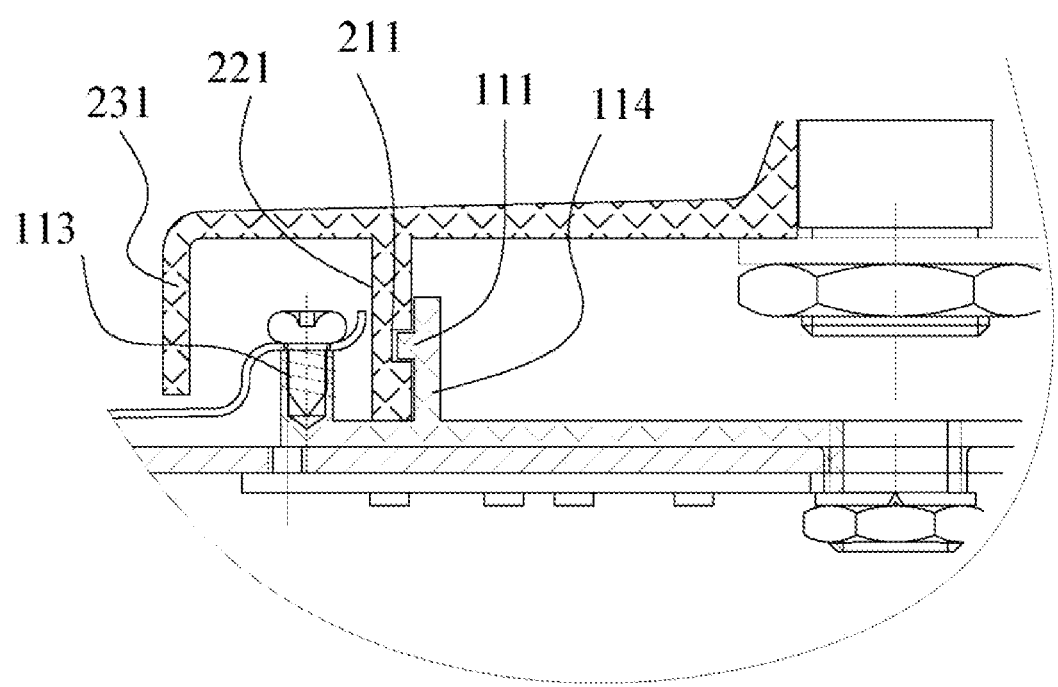
FIG. 4 is a connection sectional view of the upper cover and the lower cover according to an embodiment of the present disclosure.

Referring to FIG. 3, further, in another embodiment of the present disclosure, a bottom side of the lower cover 110 corresponding to the clamping block 111 is further provided with a positioning groove 112 for fitting and positioning with the blocking portion 212.

It should be noted that, in this embodiment, preferably, the positioning groove 112 penetrates through the lower cover 110, and the penetrating structure of the positioning groove can prevent the situation that the positioning groove 112 cannot be mounted when it is thick. After the clamping block 111 is clamped into the clamping groove 211, the lower side of the clamping groove 211 adheres to the bottom of the lower cover 110, and the blocking portion 212 adheres to a side wall of the positioning groove 112, so that the positioning groove 112 can be sealed to avoid affecting the waterproof performance.

Further, in another embodiment of the present disclosure, a plurality of first connecting holes 117 for connecting external components are further reserved in the lower cover 110.

It should be noted that the first connecting hole 117 can be configured to connect any component, for example, connecting an external water-blocking component through a connecting piece. Since a certain gap is reserved between the upper cover 200 and the lower cover 110 after mounting, the first connecting hole 117 is formed so that the water-blocking component can be arranged through the gap to further improve the waterproof performance of the ceiling fan. The first connecting hole may alternatively be configured to connect other components. The specific connection mode and components can be selected according to actual needs.

Referring to FIG. 2 and FIG. 3, further, in another embodiment of the present disclosure, a mounting hole 222 is formed in the upper cover 200, a column bolt 115 passing through the lower cover 110 is arranged at a position of the lower cover 110 corresponding to the mounting hole 222, an inner side of the column bolt 115 is provided with an internal thread, and an outer side of the column bolt 115 is provided with an external thread.

It should be noted that the mounting hole 222 and the column bolt 115 are configured to be connected with a motor 300. Lower sides of most motors are usually provided with screwing members for connection with lamps. For example, in this embodiment, the lower side of the motor 300 is provided with a motor column bolt 310. Therefore, the mounting hole 222 is formed in the upper cover 200, so that the motor column bolt 310 can pass through the internal thread of the column bolt 115 for fitting and connection, to fix the motor 300. It can be understood that the lower cover 110 can be integrally formed with the lamp 100, or can be fixedly connected to the lamp 100 through a screwing member. In this embodiment, preferably, the fixed connection is implemented, which facilitates disassembly, assembly, maintenance and replacement. Based on this, in this embodiment, the outer side of the column bolt 115 is provided with the external thread, so that the column bolt can be fixedly connected with the lamp through screw-thread fitting.

Further, in another embodiment of the present disclosure, one side of the column bolt 115 is further provided with a positioning block 116, and the positioning block 116 and the column bolt 115 are integrally formed.

In this embodiment, since the lamp usually includes a plurality of components, in order to implement the unification of assembly, the positioning block 116 is integrally formed in the column bolt 115, which can improve the accuracy of mounting the lamp 100.

Figure 5:
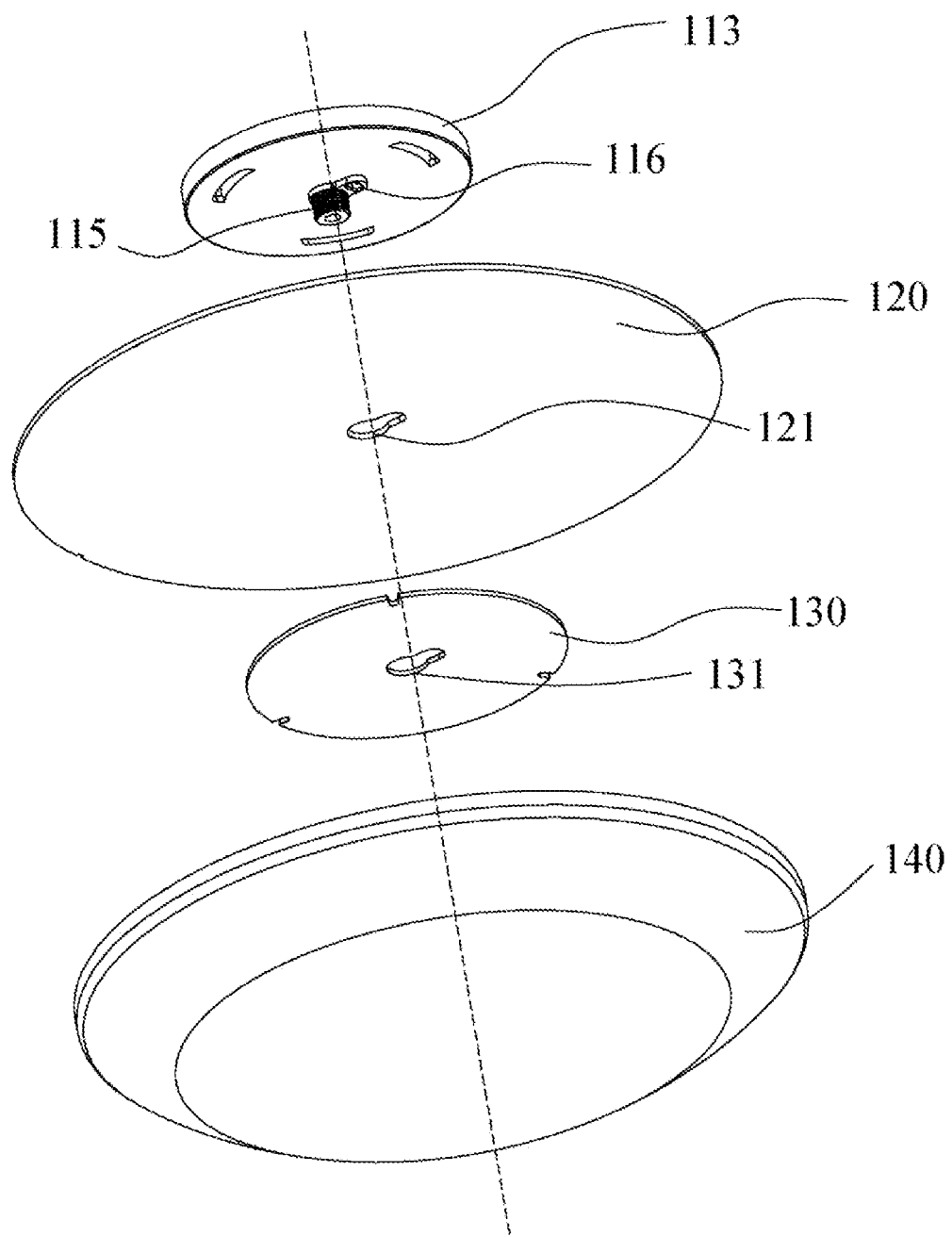
FIG. 5 is a schematic exploded view of a lamp according to an embodiment of the present disclosure.

Referring to FIG. 5, in another embodiment of the present disclosure, the lamp 100 further includes a heat dissipation pad 120, a lamp panel 130 and a lampshade 140 which are fixedly connected to the lower cover 110.

It should be noted that the components included in the lamp 100 can be arbitrarily matched, as long as the basic functions of the lamp 100 can be realized, and details are not repeated herein. It can be understood that since the positioning block 116 is arranged in the column bolt 115, in this embodiment, preferably, a first through hole 121 is formed in the heat dissipation pad 120 and a second through hole 131 is formed in the lamp panel 130, and the shapes and positions of the first through hole 121 and the second through hole 131 are the same as those of the column bolt 115 and the positioning hole 116, thereby ensuring that the mounting directions are consistent during mounting.

Figure 6:
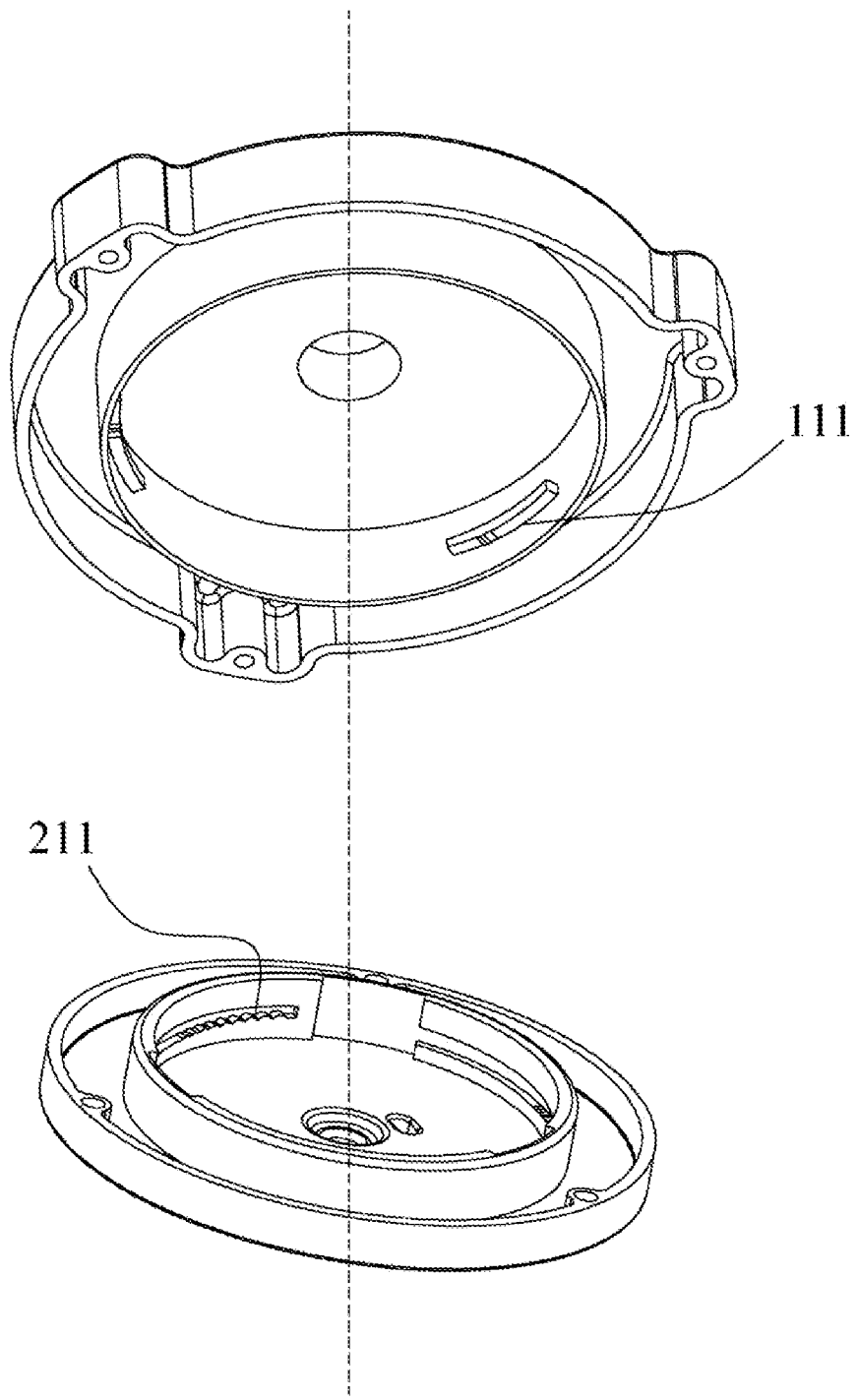
FIG. 6 is a schematic diagram showing the connection of an upper cover and a lower cover according to another embodiment of the present disclosure.
Figure 7:
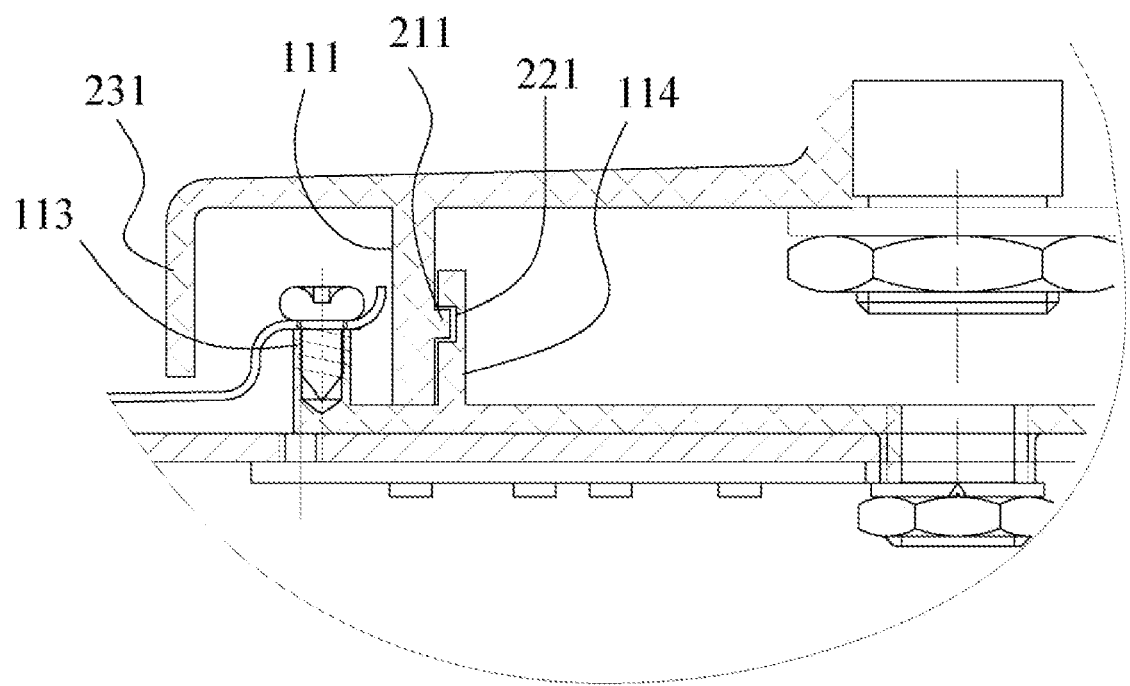
FIG. 7 is a connection sectional view of the upper cover and the lower cover according to another embodiment of the present disclosure.

In addition, referring to FIG. 6 and FIG. 7, another embodiment of the present disclosure further provides a quick connection device with a waterproof function, which is roughly the same as the structure of the above embodiment, and differs in that: the clamping block 111 is arranged at the inner side of the upper cover body 221, and the clamping groove 211 is formed in the inner side of the lower cover body 114.

The embodiments of the present disclosure are described in detail above with reference to the accompanying drawings, but the present disclosure is not limited to the above embodiments, and within the scope of knowledge possessed by those of ordinary skill in the art, various changes can also be made without departing from the concept of the present disclosure.

What is claimed is:

1. A quick connection device for a ceiling fan and a lamp with a waterproof function, comprising:
   an upper cover and the lamp, wherein the upper cover comprises an upper cover body and an upper cover covering edge integrally formed with the upper cover body, the upper cover covering edge is positioned at an outer side of the upper cover body, and a clamping groove is provided at an inner wall of the upper cover body;
   wherein the lamp comprises a lower cover connected to the upper cover, the lower cover comprises a lower cover body and a lower cover covering edge integrally formed with the lower cover body, the lower cover covering edge is positioned at an outer side of the lower cover body, a clamping block is arranged on an outer wall of the lower cover body, and the lower cover body is clamped in the clamping groove of the upper cover body through the clamping block, in response to the upper cover being connected to the lower cover, the upper cover covering edge is positioned at an outer side of the lower cover covering edge, and a plane where a lower edge of the upper cover covering edge is located is lower than a plane where an upper edge of the lower cover covering edge is located.

2. The quick connection device of claim 1, wherein a plurality of anti-sliding portions are provided at an outer side surface of the upper cover covering edge.

3. The quick connection device of claim 2, wherein each of the plurality of anti-sliding portions is a protrusion protruding from the outer side surface of the upper cover covering edge, and a plurality of second connecting holes for arranging a connecting piece are further formed in the plurality of anti-sliding portions.

4. The quick connection device of claim 1, wherein the clamping groove is a sliding groove with a single side opening, and a tooth-shaped protrusion for fastening the clamping block is provided at a contact surface between the clamping groove and the clamping block.

5. The quick connection device of claim 4, wherein the upper cover covering edge comprises at least two clamping grooves, a groove is formed between adjacent clamping grooves, and a blocking portion is respectively formed at two sides of the groove.

6. The quick connection device of claim 5, wherein a positioning groove for fitting and positioning with the blocking portion is provided at a position of a bottom side of the lower cover corresponding to the clamping block.

7. The quick connection device of claim 1, wherein a plurality of first connecting holes for connecting an external component are arranged in the lower cover.

8. The quick connection device of claim 1, wherein a mounting hole is arranged in the upper cover, a column bolt passing through the lower cover is arranged at a position of the lower cover corresponding to the mounting hole, an inner side of the column bolt is provided with an internal thread, and an outer side of the column bolt is provided with an external thread.

9. The quick connection device of claim 8, wherein a positioning block is provided at one side of the column bolt, and the positioning block and the column bolt are integrally formed.

10. The quick connection device of claim 9, wherein the lamp further comprises a heat dissipation pad, a lamp panel and a lampshade which are fixedly connected to the lower cover.

* * * * *